United States Patent
Hur et al.

(10) Patent No.: US 6,690,587 B2
(45) Date of Patent: Feb. 10, 2004

(54) APPARATUS AND METHOD OF SUPPRESSING LOW SPEED RIPPLE CURRENT OF A SINGLE-PHASE INVERTER

(75) Inventors: Kyeon Hur, Seoul (KR); Sang-Hoon Lee, Seongnam (KR); Min-Hyun Park, Chunchon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 10/156,179

(22) Filed: May 29, 2002

(65) Prior Publication Data

US 2003/0133314 A1 Jul. 17, 2003

(30) Foreign Application Priority Data

Jan. 12, 2002 (KR) .......................... 2002-1850

(51) Int. Cl.⁷ .............................. H02M 1/12; H02P 7/36
(52) U.S. Cl. ........................................ 363/41; 318/768
(58) Field of Search ........................... 363/39, 37, 40, 363/41; 318/701, 703, 798, 806, 768, 711

(56) References Cited

U.S. PATENT DOCUMENTS

| 4,978,894 A | 12/1990 | Takahara |
| 5,014,177 A | 5/1991 | Nuechterlein |

*Primary Examiner*—Rajnikant B. Patel
(74) *Attorney, Agent, or Firm*—Staas & Halsey LLP

(57) ABSTRACT

An apparatus and method to suppress a low speed ripple current to a motor include a power supply unit to supply single-phase alternating current (AC) power. A rectifying and smoothing unit rectifies and smoothes the single-phase AC power and outputs a direct current (DC) voltage indicative thereof. An inverter receives and converts the DC voltage to a motor driving current to drive the motor. A controller compares an envelope detected from a ripple current in the motor driving current and a DC component extracted from the ripple current and generates a compared result therefrom, and controls an output voltage from the inverter according to the compared result.

20 Claims, 6 Drawing Sheets

APPARATUS AND METHOD OF SUPPRESSING LOW SPEED RIPPLE CURRENT OF A SINGLE-PHASE INVERTER

CROSS-REFERENCE TO RELATED APPLICATIONS

This application claims the benefit of Korean Application No. 2002-1850, filed Jan. 12, 2002, in the Korean Patent Office, the disclosure of which is incorporated herein by reference.

BACKGROUND OF THE INVENTION

1. Field of the Invention

The present invention relates to an apparatus and method of suppressing a low speed ripple current of a single-phase inverter, and more particularly to an apparatus and method of suppressing a low speed ripple current of a single-phase inverter, which controls an output voltage of the single-phase inverter at an interval during which the low speed ripple current is generated, thus, preventing negative effects caused by the low speed ripple current.

2. Description of the Related Art

Generally, inverters to convert direct current (DC) power into alternating current (AC) power are used to control a speed of a motor. The inverters are classified into two types: three-phase inverters supplied with DC power, which is obtained by rectifying three-phase AC power, and single-phase inverters supplied with DC power, which is obtained by rectifying a single-phase AC power.

Low speed ripple voltage included in full-wave rectified DC power is higher when using the single-phase AC power compared to using the three-phase AC power, such that an input signal is unstable for a single-phase inverter. Accordingly, a low speed ripple current is generated in a motor driving current outputted from the single-phase inverter, thereby decreasing control performance of a motor and shortening the inverter's life due to overheating of the motor. Therefore, in a control system for driving the motor using the single-phase inverter, it is required to effectively prevent negative effects caused by the low speed ripple current.

In the related art, various methods for suppressing the low speed ripple current are proposed with respect to the three-phase inverter. However, such methods are limited in that the methods are usefully applied on condition that the input signal of the three-phase inverter is comparatively stable. Accordingly, the methods are inappropriate for the single-phase inverter.

SUMMARY OF THE INVENTION

Accordingly, the present invention has been made keeping in mind the above problems occurring in the prior art, and an object of the present invention is to provide an apparatus and method of suppressing low speed ripple current of a single-phase inverter, which controls an output voltage of the inverter appropriately, thus, preventing negative effects caused by a low speed ripple current.

In order to accomplish the above and other objects, the present invention provides an apparatus to suppress a low speed ripple current to a motor, including: a power supply unit supplying single-phase alternating current (AC) power; a rectifying and smoothing unit rectifying and smoothing the single-phase AC power and outputting a direct current (DC) voltage indicative thereof; an inverter receiving and converting the DC voltage to a motor driving current to drive the motor; and a controller comparing an envelope detected from a ripple current in the motor driving current and a DC component extracted from the ripple current and generating a compared result therefrom, and controlling an output voltage from the inverter according to the compared result.

The present invention further provides a method of suppressing a low speed ripple current generated when a motor is driven, including: outputting a motor driving current from a single-phase inverter to the motor; determining whether a present interval is an interval during which a low speed ripple current is generated from the motor driving current; detecting an envelope from the low speed ripple current; extracting a DC component from the low speed ripple current when the present interval is the interval during which the low speed ripple current is generated; comparing the detected envelope with the extracted DC component and generating a compared result therefrom; and controlling an output voltage of the inverter according to the compared result.

To achieve the above and other objects, the present invention provides a method to suppress a low speed ripple current to a motor, including: supplying single-phase alternating current (AC) power; rectifying and smoothing the single-phase AC power and outputting a direct current (DC) voltage indicative thereof; converting the DC voltage to a motor driving current to drive the motor; comparing an envelope detected from a ripple current in the motor driving current and a DC component extracted from the ripple current and generating a compared result therefrom; and controlling an output voltage from the inverter according to the compared result.

To achieve the above and other objects, the present invention provides an apparatus suppressing a low speed ripple current to a motor, including: an inverter providing a motor driving current to the motor; and a controller detecting an envelope of the low speed ripple current in the motor driving current, extracting a DC component from the ripple current, comparing the detected envelope with the extracted DC component to determine whether to increase or decrease an output voltage from the inverter, and outputting a control signal indicative thereof to the inverter to suppress the low speed ripple.

To achieve the above and other objects, the present invention provides a method of suppressing a low speed ripple current of a single-phase inverter driving a motor, including: supplying single-phase alternating current (AC) power; generating a direct current (DC) voltage from the single-phase AC power; generating a motor driving current from the DC voltage to drive the motor; determining whether a present interval of the motor driving current is an interval during which the low speed ripple current is generated; detecting an envelope of the low speed ripple current when the present interval is the interval in which the low speed ripple current is generated; extracting a DC component from an output current of the inverter; comparing the extracted DC component with the detected envelope to determine whether to increase or decrease an output voltage of the inverter; and outputting a signal to the inverter corresponding to whether to increase or decrease the output voltage to suppress the low speed ripple current.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
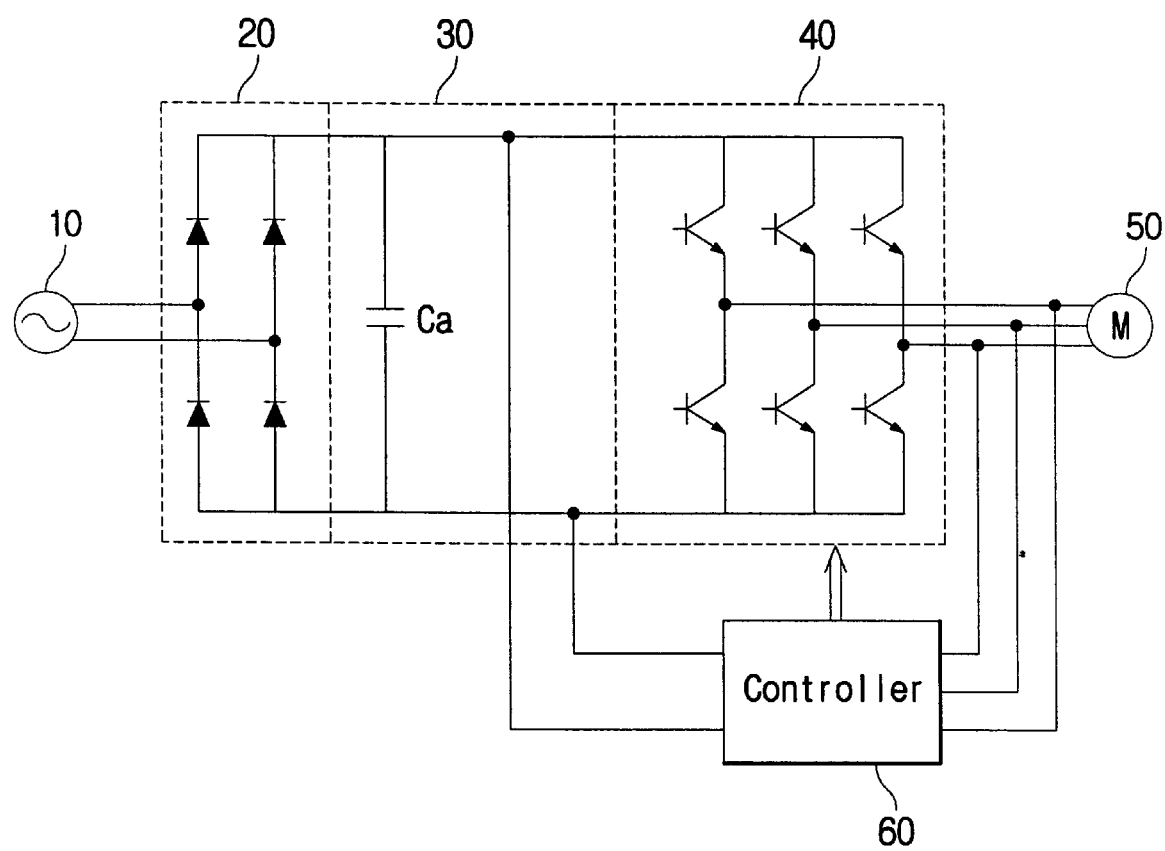
FIG. 1 is a block diagram of an apparatus suppressing a low speed ripple current of a single-phase inverter according to an embodiment of the present invention.

FIG. 1 is a block diagram of an apparatus suppressing low speed ripple current of a single-phase inverter according to an embodiment of the present invention.

As shown in FIG. 1, the suppressing apparatus of this invention includes an AC power supply unit 10 supplying single-phase AC power, a rectifying unit 20 and a smoothing unit 30 rectifying and smoothing the single-phase AC power, respectively, an inverter 40 receiving a rectified and smoothed DC voltage and outputting a current and a voltage for driving a motor 50, and a controller 60 controlling the inverter 40.

The smoothing unit 30 is realized as a smoothing capacitor Ca charged by the rectified DC voltage from the rectifying unit 20. In this case, the DC voltage charged in the smoothing capacitor Ca is supplied to the inverter 40. The DC voltage supplied to the inverter 40 is unstable, and especially, if a motor driving frequency approaches a frequency of the single-phase AC power, for example, if a power frequency of the single-phase AC power supply unit 10 is 60 Hz and a motor driving frequency becomes higher than 58 Hz, a phenomenon, i.e., a current beat phenomenon, occurs where the low speed ripple current is generated in the output current of the inverter 40. Accordingly, the low speed ripple current causes some problems such as unstable driving of the motor. The inverter 40 is supplied with the DC voltage which is rectified by the rectifying unit 20 and smoothed by the smoothing unit 30 to provide an output voltage corresponding to a control signal from the controller 60, as described later, to the motor 50.

Figure 2:
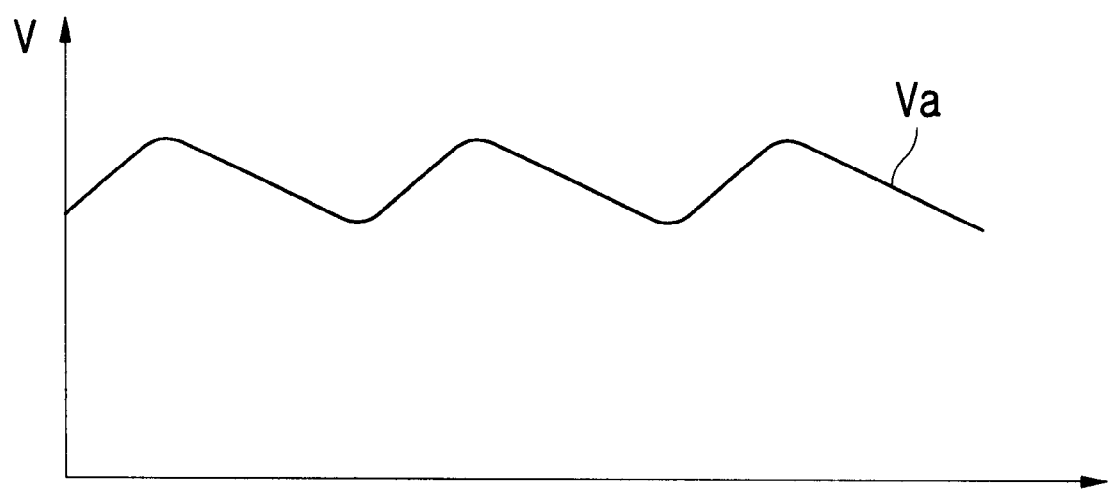
FIG. 2 is a waveform diagram of a signal outputted to an inverter from a smoothing unit of the apparatus of FIG. 1.
Figure 3:
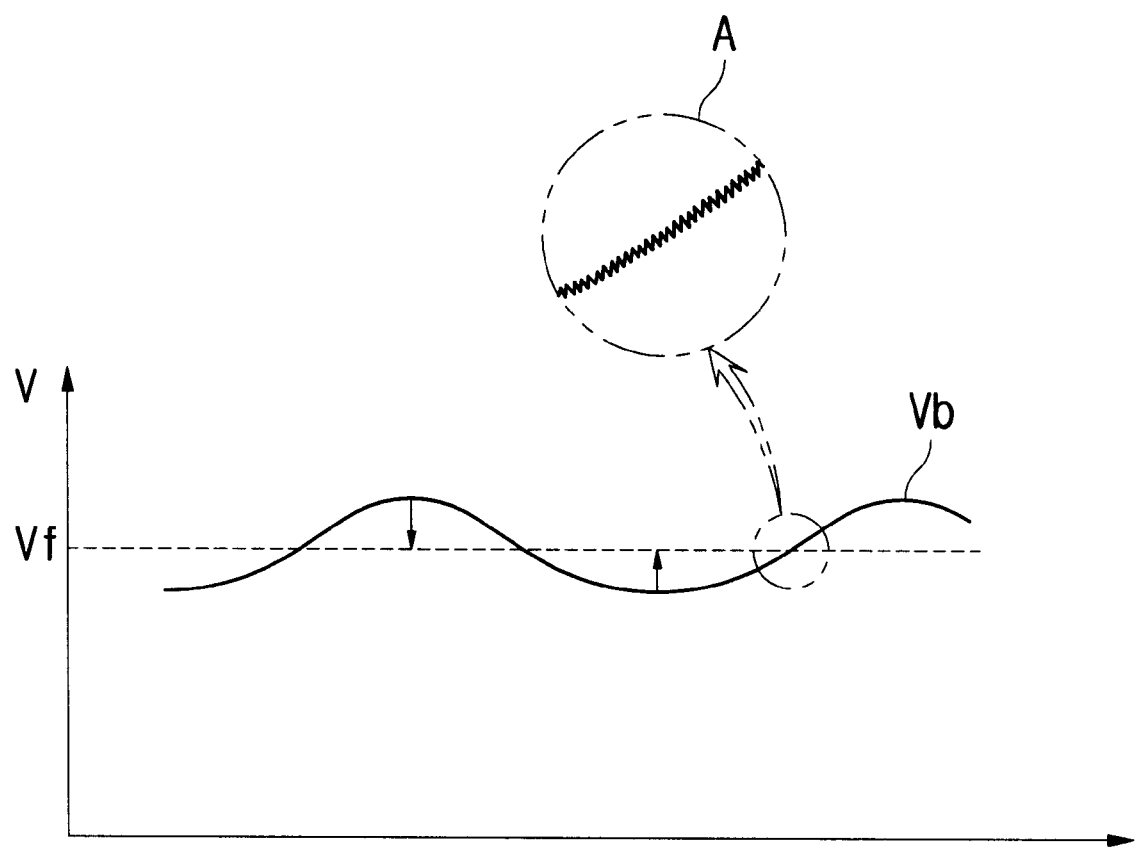
FIG. 3 is a waveform diagram of a signal outputted to a motor from the inverter.

The DC voltage of the capacitor Ca can be represented by an envelope of the rectified voltage, as shown in FIG. 2, which is an unstable voltage Va including a ripple voltage. However, if the motor driving frequency approaches the power frequency of the single-phase AC power, the current beat phenomenon occurs in a motor driving current outputted from the inverter 40, such that the low speed ripple current in the motor driving current is also increased. The current beat phenomenon occurs because the inverter 40 supplied with the DC voltage having the low speed ripple voltage from the smoothing unit 30 is not controlled appropriately. Accordingly, a difference is generated between a motor driving voltage Vb applied to the motor 50 from the inverter 40 and a target voltage Vf to generate a torque with a constant speed to be controlled, as shown in FIG. 3, thereby causing the motor control performance to be unstable.

Accordingly, the controller 60 receives a portion of the motor driving current provided to the motor 50 from the inverter 40 to detect the motor driving frequency. Further, the controller 60 recognizes a present interval as an interval during which the low speed ripple current is generated if the motor driving frequency approaches the frequency of the single-phase AC power, for example, if the single-phase AC power of 60 Hz is used, an interval during which the motor driving frequency is higher than 55 Hz is defined as a ripple current generation interval. Thus, the controller 60 performs a control operation for controlling the output voltage of the inverter 40 to suppress the low speed ripple current.

When the control operation to suppress the low speed ripple current is performed, the controller 60 detects an envelope of the low speed ripple current in the motor driving current from the inverter 40, and extracts a DC component dc from the ripple current. Then, the controller 60 compares the detected envelope with the extracted DC component dc to decide whether to increase or decrease the output voltage of the inverter 40. Then, the controller 60 outputs a control signal corresponding to the decision to the inverter 40. For example, if the detected envelope is greater than the extracted DC component, the controller 60 outputs the control signal to decrease the output voltage from the inverter 40 to the motor 50. In contrast, if the extracted DC component is greater than the detected envelope, the controller 60 outputs the control signal to increase the output voltage from the inverter 40 to the motor 50. The control signal from the controller 60 to the inverter 40 is a PWM signal capable of adjusting the output signal Vb according to a pulse width, wherein the output voltage Vb varied according to the PWM signal changes in each period, as shown in A of FIG. 3.

Figure 4A:
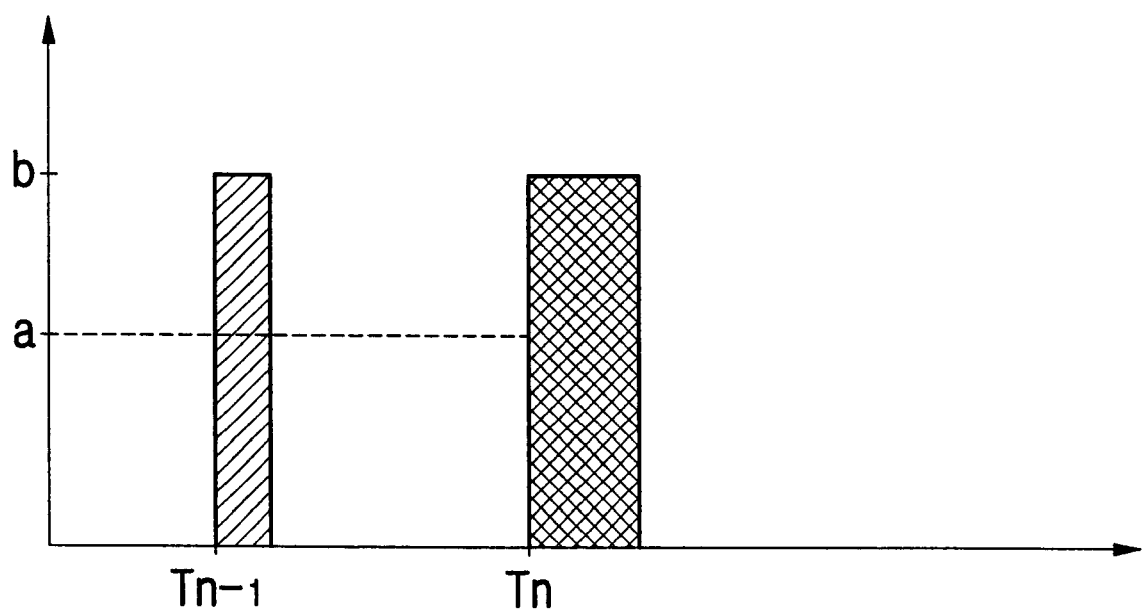
FIG. 4A is a waveform diagram of a PWM signal to control the inverter when a controller increases an output voltage of the inverter.

The controller 60 applies the control signal to the inverter 40 to decrease the output voltage Vb to the target voltage Vf if the detected envelope is greater than the extracted DC component, and consequently the output voltage Vb is higher than the target voltage Vf. In this case, the controller 60 outputs the PWM signal with an increased pulse width compared with a previous period Tn−1 to the inverter 40, as shown in FIG. 4A.

Figure 4B:
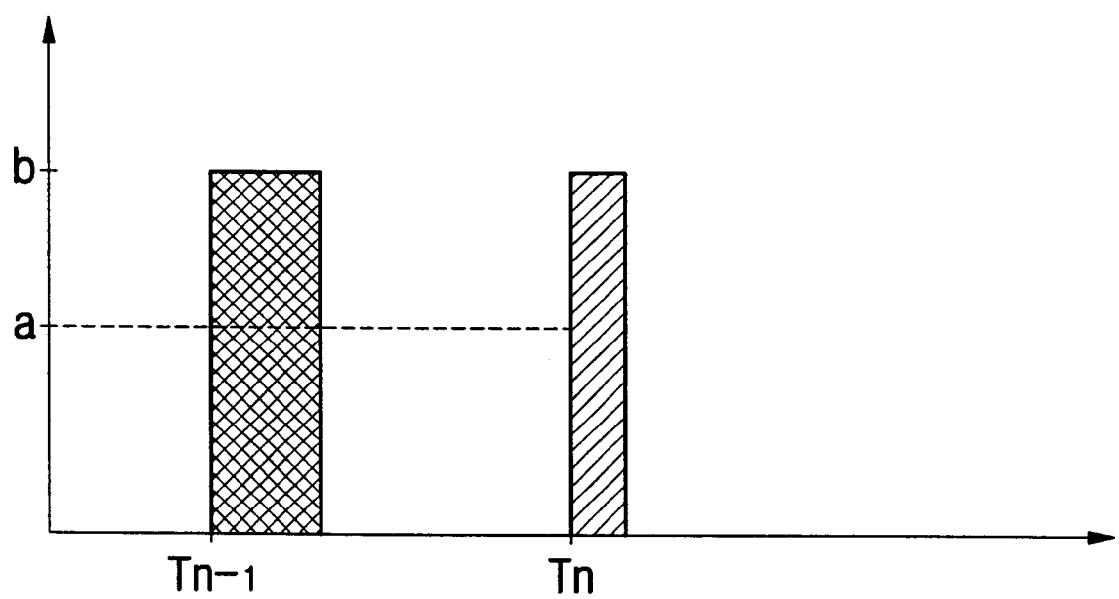
FIG. 4B is a waveform diagram of a PWM signal to control the inverter when the controller decreases the output voltage of the inverter.

Further, the controller 60 applies to the inverter 40 the control signal to increase the output voltage Vb to the target voltage Vf if the detected envelope is not greater than the extracted DC component, and consequently the output voltage Vb is lower than the target voltage Vf. In this case, the controller 60 outputs the PWM signal with a decreased pulse width compared with the previous period Tn−1 to the inverter 40 as shown in FIG. 4B. As described above, the low speed ripple current is suppressed under the control of the controller 60, allowing the motor to be stably controlled even though the motor driving frequency approaches the frequency of the single-phase AC power.

Figure 5:
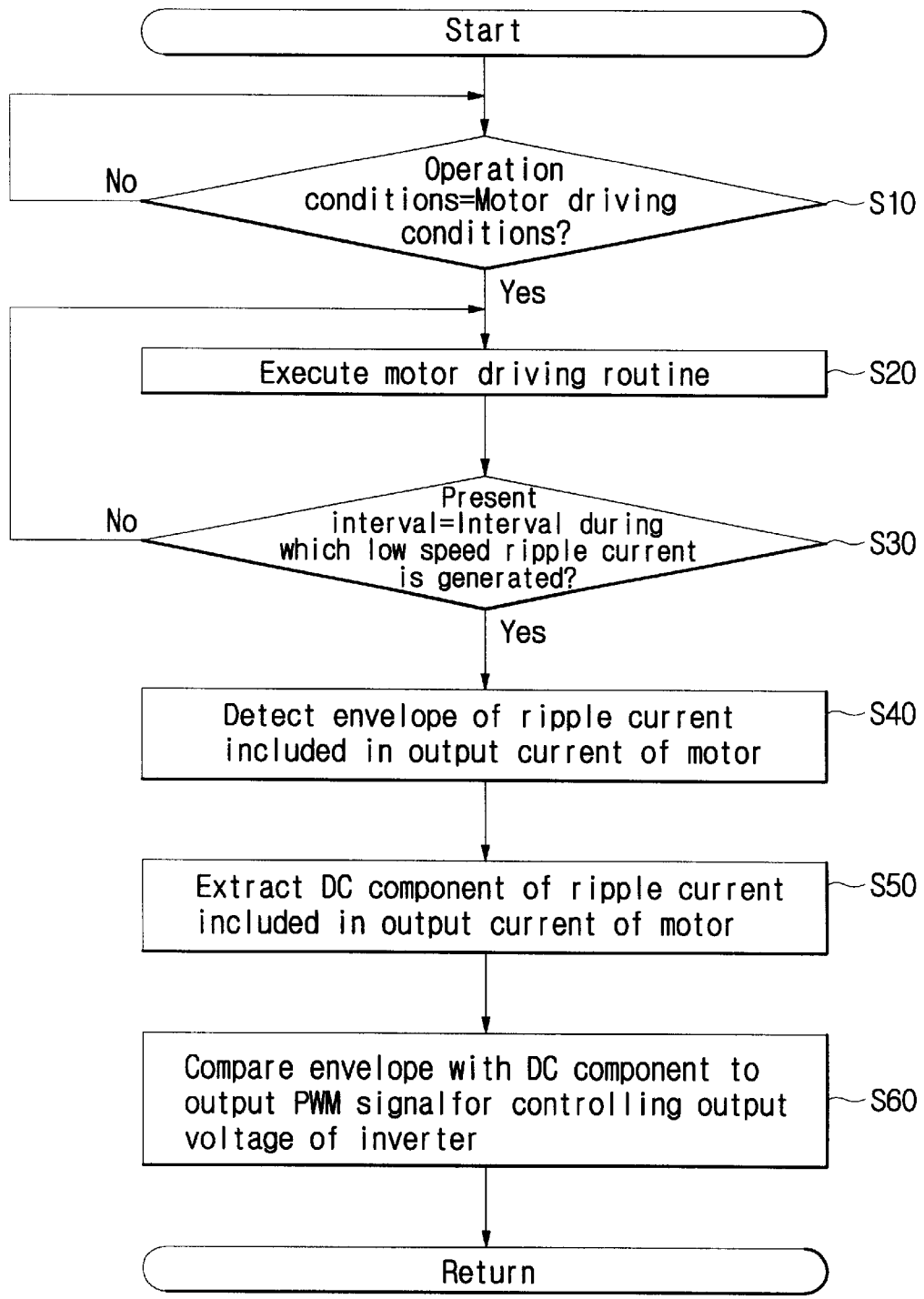
FIG. 5 is a flowchart of a method of suppressing the low speed ripple current of the single-phase inverter, according to an embodiment of the present invention.

Hereinafter, the method of suppressing the low speed ripple current of a single-phase inverter according to the present invention is described with reference to FIG. 5. At operation S10, the controller 60 determines whether operating conditions correspond to driving conditions of the motor 50. If the operating conditions do not correspond to the driving conditions of the motor 50, according to a determination result, the controller 60 stands by.

If the controller 60 determines that the operating conditions correspond to the motor driving conditions according to the determination result, at operation S20, the controller 60 performs a motor driving routine controlling the inverter 40 so as to drive the motor 50 according to a given control program. During the motor driving routine, at operation S30, the controller 60 determines whether a present interval is an interval during which the low speed ripple current is generated. At this time, the controller 60 inputs a part of the motor driving current, which is applied to the motor 50 from the inverter 40, to detect the motor driving frequency. Further, the controller 60 determines that the present interval is the interval during which the low speed ripple current is generated if the motor driving frequency approaches the frequency of the single-phase AC power. For example, if the single-phase AC power of 60 Hz is used, the interval during which the motor driving frequency is higher than 55 Hz is defined as the interval during which the low speed ripple current is generated.

At operation S30, if the present interval is not the low speed ripple current generation interval according to the determination result, the controller 60 returns to operation S20 to perform the motor driving operation continuously. However, if the present interval is the low speed ripple current generation interval according to the determination result at operation S30, at operation S40, the controller 60 detects the envelope of the low speed ripple current in the output current of the inverter 40.

At operation S50, the controller 60 extracts the DC component from the output current of the inverter 40. At operation S60, the controller 60 compares the extracted DC component with the detected envelope to decide whether to increase or decrease the output voltage Vb of the inverter 40 as shown in FIG. 3, and then outputs the PWM signal corresponding to the decision to the inverter 40; thus, enabling the output voltage Vb to reach the target voltage Vf. The controller 60 returns to repeatedly execute the above control process.

As described above, the present invention provides an apparatus and method of suppressing a low speed ripple current of a single phase inverter, which controls an output voltage of an inverter under a control of a controller; thus, suppressing low speed ripple current, although a DC voltage applied to the inverter is unstable. Thus, the low speed ripple current may be generated in a motor driving current to drive a motor. The present invention can prevent negative effects caused by the low speed ripple current generated when a motor driving frequency approaches a frequency of a single-phase AC power. Accordingly, the present invention is advantageous by providing satisfactory motor control performance and by performing a stable motor control operation in a motor control system employing the single-phase inverter.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus to suppress a low speed ripple current to a motor, comprising:
   a power supply unit supplying single-phase alternating current (AC) power;
   a rectifying and smoothing unit rectifying and smoothing the single-phase AC power and outputting a direct current (DC) voltage indicative thereof;
   an inverter converting the DC voltage to a motor driving current to drive the motor; and
   a controller comparing an envelope detected from a ripple current in the motor driving current and a DC component extracted from the ripple current and generating a compared result therefrom, and controlling an output voltage from the inverter according to the compared result.

2. The apparatus according to claim 1, wherein the controller controls the output voltage from the inverter to suppress the low speed ripple current generated when a difference between a driving frequency of the motor and a frequency of the single-phase AC power is within a predetermined value.

3. The apparatus according to claim 1, wherein the controller decreases the output voltage of the inverter when the envelope of the ripple current is greater than the DC component, and the controller increases the output voltage of the inverter when the envelope of the ripple current is less than the DC component.

4. A method of suppressing a low speed ripple current generated when a motor is driven, comprising:
   outputting a motor driving current from a single-phase inverter to the motor;
   determining whether a present interval comprises an interval during which a low speed ripple current is generated from the motor driving current;
   detecting an envelope from the low speed ripple current;
   extracting a DC component from the low speed ripple current when the present interval is the interval during which the low speed ripple current is generated;
   comparing the detected envelope with the extracted DC component and generating a compared result therefrom; and
   controlling an output voltage of the inverter according to the compared result.

5. The method according to claim 4, wherein the determination is performed where the present interval is determined to be the interval during which the low speed ripple current is generated when a difference between a driving frequency of the motor and a frequency of a single-phase AC power is within a predetermined value.

6. The method according to claim 4, wherein the controlling of the output voltage of the inverter comprises decreasing the output voltage when the envelope of the ripple current is greater than the DC component, and increasing the output voltage of the inverter when the envelope of the ripple current is less than the DC component.

7. A method to suppress a low speed ripple current to a motor, comprising:
   supplying single-phase alternating current (AC) power;
   rectifying and smoothing the single-phase AC power and outputting a direct current (DC) voltage indicative thereof;
   converting the DC voltage to a motor driving current to drive the motor;
   comparing an envelope detected from a ripple current in the motor driving current and a DC component extracted from the ripple current and generating a compared result therefrom; and
   controlling an output voltage from the inverter according to the compared result.

8. The method according to claim 7, wherein the controlling of the output voltage comprises suppressing the low speed ripple current generated when a difference between a driving frequency of the motor and a frequency of the single-phase AC power is within a predetermined value.

9. The method according to claim 7, wherein the controlling of the output voltage comprises decreasing the output voltage when the envelope of the ripple current is greater than the DC component, and increasing the output voltage controlled when the envelope of the ripple current is less than the DC component.

10. An apparatus suppressing a low speed ripple current to a motor, comprising:

an inverter providing a motor driving current to the motor;

a controller detecting an envelope of the low speed ripple current in the motor driving current, extracting a DC component from the ripple current, comparing the detected envelope with the extracted DC component to determine whether to increase or decrease an output voltage from the inverter, and outputting a control signal indicative thereof to the inverter to suppress the low speed ripple.

11. The apparatus according to claim 10, wherein when the detected envelope is greater than the extracted DC component, the controller outputs the control signal to decrease the output voltage from the inverter to the motor, and when the extracted DC component is greater than the detected envelope, the controller outputs the control signal to increase the output voltage from the inverter to the motor.

12. The apparatus according to claim 10, wherein the controller applies the control signal to the inverter to decrease an output voltage Vb from the inverter to a target voltage Vf when the detected envelope is greater than the extracted DC component.

13. The apparatus according to claim 12, wherein the control signal comprises a PWM signal with an increased pulse width compared with a previous period Tn−1 when the detected envelope is greater than the extracted DC component.

14. The apparatus according to claim 10, wherein the controller applies the control signal to the inverter to increase an output voltage Vb from the inverter to a target voltage Vf if the detected envelope is less than the extracted DC component.

15. The apparatus according to claim 14, wherein the control signal comprises a PWM signal with a decreased pulse width compared with a previous period Tn−1 when the detected envelope is less than the extracted DC component.

16. A method of suppressing a low speed ripple current of a single-phase inverter driving a motor, comprising:

supplying single-phase alternating current (AC) power;

generating a direct current (DC) voltage from the single-phase AC power;

generating a motor driving current from the DC voltage to drive the motor;

determining whether a present interval of the motor driving current is an interval during which the low speed ripple current is generated;

detecting an envelope of the low speed ripple current when the present interval is the interval in which the low speed ripple current is generated;

extracting a DC component from an output current of the inverter;

comparing the extracted DC component with the detected envelope to determine whether to increase or decrease an output voltage of the inverter; and outputting a signal to the inverter corresponding to whether to increase or decrease the output voltage to suppress the low speed ripple current.

17. The method according to claim 16, wherein the present interval is determined to be the interval during which the low speed ripple current is generated when a difference between a driving frequency of the motor and a frequency of a single-phase AC power is within a predetermined value.

18. The method according to claim 16, wherein when the present interval is not the low speed ripple current generation interval according to the determination result, the motor driving operation is performed continuously.

19. The method according to claim 16, wherein the signal corresponding to whether to increase or decrease the output voltage is a PWM signal capable of adjusting the output signal Vb according to a pulse width, wherein the output voltage Vb is varied according to the PWM signal changes in each period.

20. The method according to claim 16, further comprising:

detecting a motor driving frequency from the motor driving current;

detecting a frequency of the single-phase AC power; and determining whether the present interval is the interval during which the low speed ripple current is generated when the motor driving frequency approaches the frequency of the single-phase AC power.

* * * * *